COLOR TELEVISION RECEIVER CHROMINANCE CONTROL CIRCUIT

Filed April 26, 1956 4 Sheets-Sheet 1

INVENTORS
ROLAND N. RHODES
& JOSEPH O. PREISIG
BY Olin D. Mitchell
ATTORNEY

COLOR TELEVISION RECEIVER CHROMINANCE CONTROL CIRCUIT

Filed April 26, 1956 4 Sheets-Sheet 2

INVENTORS
ROLAND N. RHODES &
JOSEPH O. PREISIG
BY [signature]
ATTORNEY

COLOR TELEVISION RECEIVER CHROMINANCE CONTROL CIRCUIT

Filed April 26, 1956 4 Sheets-Sheet 3

INVENTORS
ROLAND N. RHODES
& JOSEPH O. PREISIG
BY Olin D. Mitchell
ATTORNEY

COLOR TELEVISION RECEIVER CHROMINANCE CONTROL CIRCUIT

Filed April 26, 1956 4 Sheets-Sheet 4

INVENTORS
ROLAND N. RHODES &
JOSEPH O. PREISIG
BY Olin D. Mitchell
ATTORNEY

United States Patent Office
2,982,812
Patented May 2, 1961

2,982,812

COLOR TELEVISION RECEIVER CHROMINANCE CONTROL CIRCUIT

Roland N. Rhodes, Levittown, Pa., and Joseph O. Preisig, Trenton, N.J., assignors to Radio Corporation of America, a corporation of Delaware Filed Apr. 26, 1956, Ser. No. 580,748

13 Claims. (Cl. 178—5.4)

The present invention relates to improved circuits for providing automatic chroma control and color killer action, either singly or in combination, in a color television receiver.

The television signal transmitted in commercial television broadcasting includes a monochrome information signal and picture deflection signals. When the transmission is that relating to a color image, the television signal also includes a chrominance signal and color synchronizing bursts. The chrominance signal contains color difference signals which are demodulated by synchronous demodulation. The color synchronizing bursts include reference phase information so that synchronous demodulating signals can be developed at a point remote from the transmitter, such as at a receiver; the color synchronizing bursts are transmitted on the "back porch" of the horizontal synchronizing pulses.

A modern color television receiver may include either automatic chroma control circuits or color killer circuits or both. An automatic chroma control circuit maintains the amplitude of the chrominance signal in the chrominance channels of the receiver at a substantially constant level regardless of fluctuations of the signal strength of an incoming television signal. The color killer circuit is a circuit which, responsive to the presence or absence of color synchronizing bursts in a color television signal, prevents spurious information, which might be developed by higher frequency components of the monochrome signal in the crominance channels during monochrome transmission, from being applied to the color image reproducer.

Color killer action relies on information relating to the presence or absence of the bursts; since the amplitude of the color synchronizing bursts, when present, is indicative of the signal strength of the chrominance signal in the television signal, information relating to burst amplitude is used for automatic chroma control. In order for automatic chroma control and color killer circuits to be useful and effective in a modern television receiver, it is essential that these circuits be immune to noise and be positive acting circuits which require a minimum number of circuit components so that the cost of manufacture of the color television receiver is not unduly increased.

It is an object of the present invention to provide a simplified and positive acting automatic chroma control and color killer circuit.

It is another object of this invention to provide an automatic chroma color killer circuit and an automatic chroma control circuit which performs at low signal level and under conditions of poor reception.

It is a still further object of this invention to provide a simplified means of developing a color killer control voltage and an automatic chroma control voltage in the burst-synchronized demodulating-signal source in a color television receiver.

According to the invention, a control signal indicative of both the presence or absence of the bursts and also of burst amplitude, when present, is developed by introducing a ringing signal derived from each burst, when present, into an injection-lock type of oscillator circuit whereupon the phase of the oscillator oscillations are locked to a phase prescribed by the burst and wherein a detected signal indicative of oscillator oscillation level combined with ringing signal level is developed by the mixing of the ringing signal and the phase-locked oscillator oscillations in an electron flow device of the oscillator to provide the aforementioned control voltage.

In one form of the invention, an oscillatory signal indicative of phase information relating to each color synchronizing burst is introduced into a self-oscillating synchronous detector whose self-developed oscillations are phase locked by the oscillatory signal. The synchronous detection by the phase-locked oscillations of the applied oscillations produces a control voltage indicative of burst amplitude or of burst presence or absence. This control voltage may be used to render a chrominance signal channel amplifier inoperative when the bursts are absent and provide automatic chroma control of that channel when the bursts are present.

Other and incidental objects of this invention will become apparent upon a reading of the following specification and a study of the drawings, wherein:

Figures 1, 2 and 3 are circuits of the present invention which, responsive to a filtered burst injected into an oscillator, develop therein a control voltage both indicative of the presence or absence of the color synchronizing bursts and of the amplitude of each color synchronizing burst when present.

Figure 1:
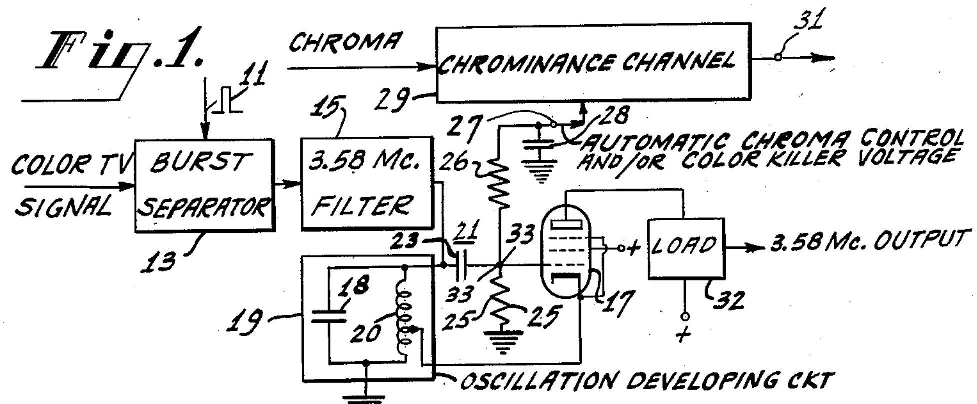
Figures 1, 2, 3 and 4 are diagrams of various forms of the present invention.

Figure 1 is a circuit illustrating one form of the invention. A color television signal and a gate pulse 11 are each applied to a burst separator 13 whose output is a separated burst. The separated burst is thereupon passed through a very narrow-band 3.58 mc. filter 15 to the control grid of the tube 17. An oscillation developing circuit can be coupled to the anode or to another grid of the tube 17. The oscillation developing circuit 19, operating in conjunction with the grid leak circuit 21 and the tube 17, develops oscillations in the electron stream of tube 17. A typical though not definitive oscillation developing circuit 19 is included in Figure 1; this circuit includes a condenser 18 in parallel with an inductance 20. The condenser 18 and the inductance 20 are designed to resonate at the frequency of the bursts. The cathode of tube 17 is coupled to a tap on inductance 20 to provide a so-called "electron coupled circuit" connection which causes oscillations to be developed in the electron stream of tube 17.

The filtered burst applied to the control grid of tube 17 will injection lock these oscillations. The grid leak circuit 21 will cause the rectification of the sum of the phase locked oscillations and of the filtered burst developed between the control grid and cathode of tube 17. Responsive to this rectification, a continuous direct current voltage will be developed at the control grid and therefore at the output terminal 27; this direct current voltage is indicative of both the presence or absence of the burst and also of the amplitude of the filtered burst when the bursts are present. This direct current voltage may be employed as either an automatic chroma control voltage or a color killer voltage or both. The direct current voltage, referred to as the automatic chroma control and/or color killer control voltage developed at the terminal 27, is thereupon applied to the chrominance channel 29 by way of a filter consisting of resistor 26 and a condenser 28 which smooths any fluctuations of the continuous voltage. The chrominance signal, termed chroma, is also applied to the chrominance channel 29. When the color synchronizing bursts are absent, the voltage developed at the control grid of the tube 17, will render the chrominance channel 29 inoperative so that no information appears at the output terminal 31. When the bursts are present, the automatic chroma control voltage provided at the control grid of the tube 17 will vary the gain of the chrominance channel 29 whereby the amplitude level of the chroma at the output terminal 31 of that channel will be maintained substantially constant regardless of fluctuations in the signal strength of the applied chroma.

The phase-locked oscillations, introduced into the electron stream of tube 17 are developed across the output load 32. This signal produced across the output load 32 is a 3.58 mc. signal which is accurately phased to the phase prescribed by the burst; this signal is useable for color selection in a color television receiver or monitor.

Figures 2, 3:
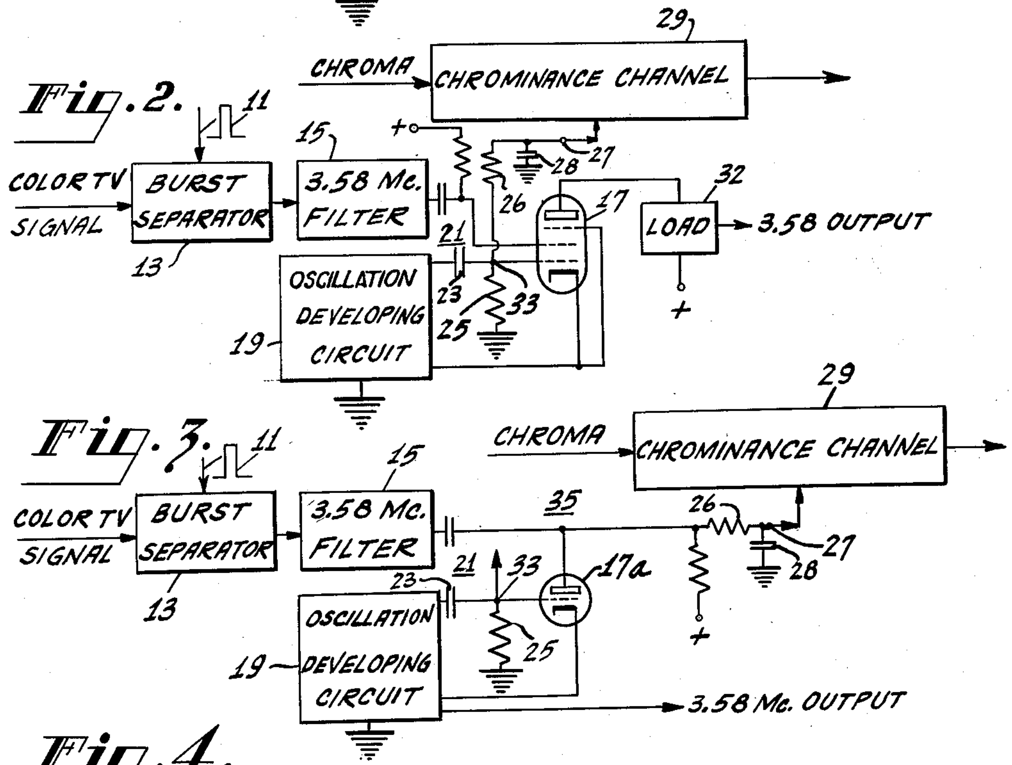

The circuits of Figures 2 and 3 illustrate other methods of developing automatic chroma control and color killer voltages from an electron tube oscillator into whose circuit a filtered burst is injected. In the circuit of Figure 1, the filtered burst from the 3.58 mc. filter 15 is applied to the same control grid to which the oscillator feedback drive is also applied and to which a direct current voltage developing network such as the grid leak network 21 is coupled. The grid leak network of Figure 1 includes the resistor 25 and the condenser 23.

In the circuit of Figure 2, the first control grid is used in conjunction with the oscillation developing circuit for introducing oscillations into the electron stream of the tube 17. The filtered bursts are appled to the second grid of tube 17. The filtered bursts on the second grid will control the electron flow to the first grid to cause injection locking of the oscillations developed by the oscillation developing circuit and develop the automatic chroma control and/or color killer control voltage at the terminal 33 which is connected to the first control grid.

The filtered burst may also be applied from the 3.58 mc. filter 15 to other control grids or electrodes of an electron tube or electron discharge device to provide a direct current control voltage of the present invention. For example, as is shown in the circuit of Figure 3, the filtered burst is applied to the anode of the triode 17*a*. The control grid and cathode of triode 17*a* are coupled to the oscillation developing circuit 19 which develops oscillations in the electron stream of the triode 17*a*. The variation of anode potential due to the filtered burst will cause phase-locking of these oscillations and rectification of the filtered bursts and the phase locked oscillations at the control grid by the grid leak circuit will develop a continuous direct current voltage in accordance with the invention. The automatic chrome control and/or color killer voltage may actually be obtained either at the control grid terminal 33 or at the anode terminal 35 and applied therefrom to the chrominance channel 29. In the case of the circuit of Figure 3, the 3.58 mc. output wave is obtainable from the oscillation developing circuit 19.

Figure 4:
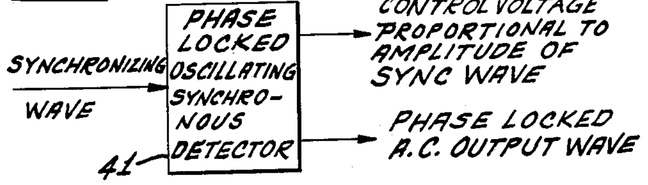

Figure 4 is a simplified block diagram illustrating one concept associated with the present invention. Consider first the action of a synchronous detector; a synchronous detector is a heterodyning device which heterodynes an intelligence bearing carrier with a synchronous demodulating wave. Let a synchronous demodulating wave be developed by self oscillation within the synchonous detector and let this synchronous demodulating carrier be phase-locked at a phase prescribed by the carrier of the intelligence bearing carrier. Upon introduction of the intelligence bearing carrier into the phase-locked oscillating synchronous detector 41, the intelligence bearing carrier will be synchronously demodulated by the phase-locked oscillations developed therein to provide an output signal which is proportional in amplitude to the signal strength of the in-phase component of the intelligence bearing carrier and which is not responsive to signal information in quadrature with the in-phase components of the intelligence bearing carrier. Thus it follows that the color killer and automatic chroma control circuit of the present invention is relatively noise immune since much of the noise attendant with, say, color synchronizing bursts in a television signal, is in the form of quadrature components; the output of the phase-locked oscillating synchronous detector is both a phase-locked 3.58 mc. output wave and a direct current control voltage having an amplitude indicative of the amplitude of the synchronizing wave.

Figure 5:
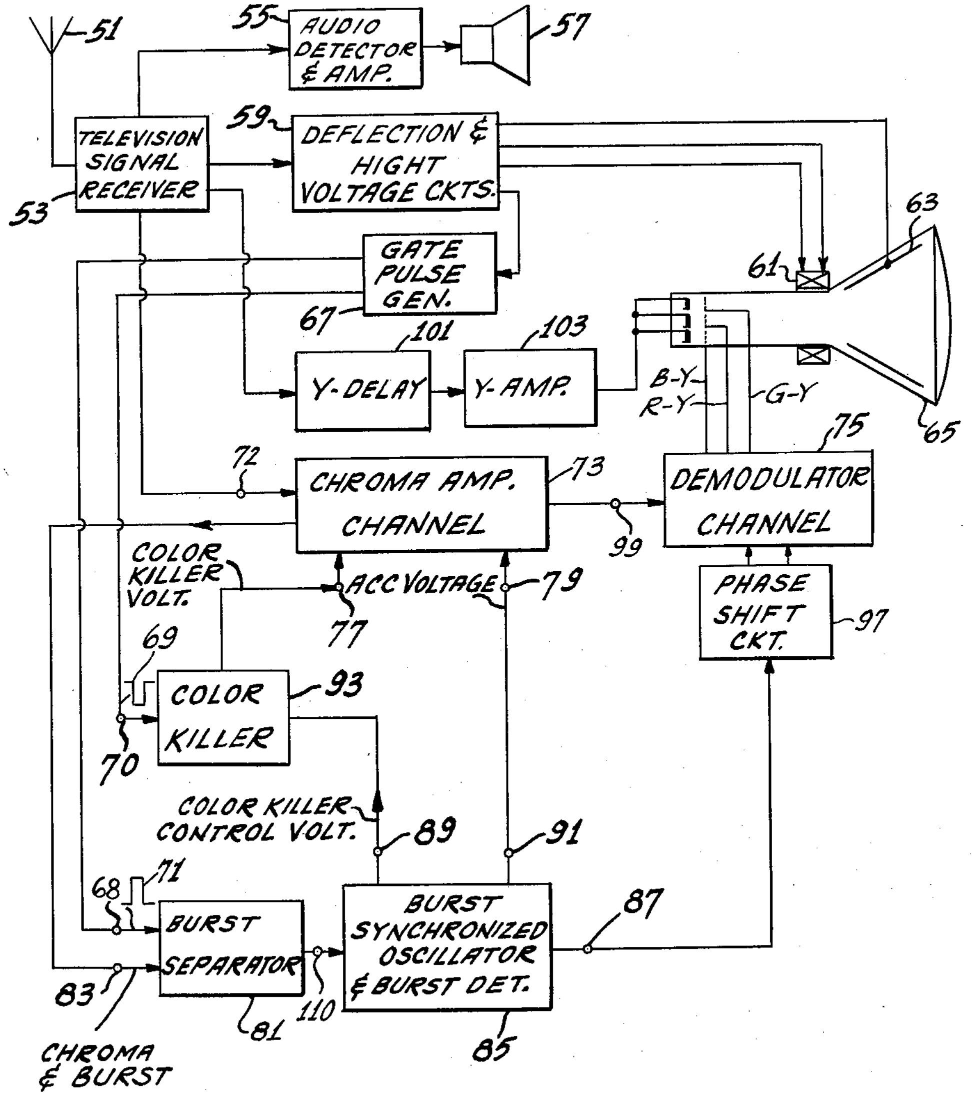
Figure 5 is a block diagram of a color television receiver.

Before considering detailed schematic diagrams illustrating alternative forms of the present invention, consider the operation of the color television receiver whose block diagram is shown in Figure 5. An incoming signal from a television broadcast transmitter is received at the antenna 51 and applied to the television signal receiver 53. The television signal receiver 53, providing first detection, intermediate frequency amplification and second detection, detects the television signal of the incoming wave. This television signal will contain the chrominance signal and color synchronizing bursts when color transmission is involved. No bursts will be included in the television signal when monochrome transmission is involved.

The detected television signal includes a sound-modulated frequency-modulated carrier which is transmitted 4½ mcs. removed from the picture carrier. Using, for example, an intercarrier sound circuit, the audio detector and amplifier 55 demodulates the sound signal, amplifies the sound signal and applies the amplified sound signal to the loud speaker 57.

The television signal is applied to the deflection and high voltage circuits 59 which separate the picture synchronizing signals from the television signal, and develops therefrom horizontal and vertical deflection signals and a high voltage. The vertical and horizontal deflection signals are applied to the deflection yoke 61; the high voltage is applied to the ultor 63 of the color kinescope 65. The deflection and high voltage circuits 59 also energize the gate pulse generator 67 which produces both a pulse 69 of negative polarity at the terminal 70 and a pulse of positive polarity 71 at the terminal 68. The pulse 71 has a time duration substantially in coincidence with the duration interval of the color synchronizing bursts. The gate pulse generator 67 is usually included in the color television receiver in the form of an auxiliary winding on a high voltage transformer of the deflection and high voltage circuits 59.

The television signal is applied by way of terminal 72 to the chroma amplifier channel 73 which separates signals in the chrominance signal band from the television signal and applies signals in this band to the demodulator channel 75. This band is in the higher frequency range of the television signal and may include the range of frequencies from 2 to 4.2 mcs. The chroma amplifier channel 73 has a pair of gain control terminals 77 and 79 at either or both of which terminals an applied voltage may be used to control the amplification or gain of the chroma amplifier channel 73.

The chroma amplifier channel 73 provides signals in the chrominance signal range of the television signal to the burst separator 81 by way of terminal 83. The burst separator 81, responsive to the gate pulse 71 and to color synchronizing bursts, when present, as provided from the chroma channel amplifier 73, develops separated color synchronizing bursts which are thereupon applied to the burst synchronized oscillator and burst detector 85. It is to be appreciated that the bursts may be separated, alternatively, from a color television signal derived directly from the television signal receiver 53.

The burst synchronized oscillator and burst detector 85 is a circuit of the type shown in Figures 1 through 4. The burst synchronized oscillator and burst detector 85, responsive to the color synchronizing bursts when present, will provide a phase-locked 3.58 mc. signal at the output terminal 87. In addition, a color killer control voltage will be applied at the output terminal 89 and an automatic chroma control voltage will be applied at the output terminal 91.

When the bursts are absent thereby signifying monochrome transmission, the color killer 93, responsive to the gate pulse 69 and to the color killer control voltage from the burst synchronized oscillator and burst detector, will apply a biasing or color killer voltage to the terminal 77 of the chroma amplifier channel 73 to render this channel inoperative. When the bursts are present, the voltage applied by the color killer 93 to the terminal 77 will not disable the transmission through the chroma amplifier channel 73. Concurrently, the burst synchronized oscillator and burst detector 85 will provide an automatic chroma control voltage to the terminal 79 of the chroma amplifier channel 73. The automatic chroma control voltage will vary inversely with respect to the signal strength of the color synchronizing bursts in the television signal from the television signal receiver 53. The output of the chroma amplifier channel 73, when the bursts are present, will thereupon be a chrominance signal or chroma whose amplitude level is substantially constant and independent of fluctuations in amplitude level of the received chroma.

A reference signal from the burst synchronized detector 85 is applied by way of terminal 87 to the phase shift circuits 97. The phase shift circuits provide selected phases of the reference signal to the demodulator channel 75, which, responsive to the chrominance signal from the chroma amplifier channel 73 by way of terminal 99, demodulates the $R-Y$, $B-Y$ and $G-Y$ color difference signals which are in turn applied to corresponding control electrodes of the color kinescope 65.

The color television signal, which constitutes principally luminance information when not subjected to synchronous demodulation, is applied by way of the Y delay line 101 and the Y amplifier 103 to the cathodes of the color kinescope 65. Signal addition of the luminance or Y signal and each of the color difference signals provided by the demodulator channel 75, is performed within the color kinescope 65 to yield the televised image on the image face of that kinescope. It is to be appreciated that the aforementioned addition of the luminance signal and the various color difference signals can be alternatively performed in signal combining circuits separate from the color image reproducer with the resultant R, B and G component color information signals applied to a color image reproducer.

Figure 6:
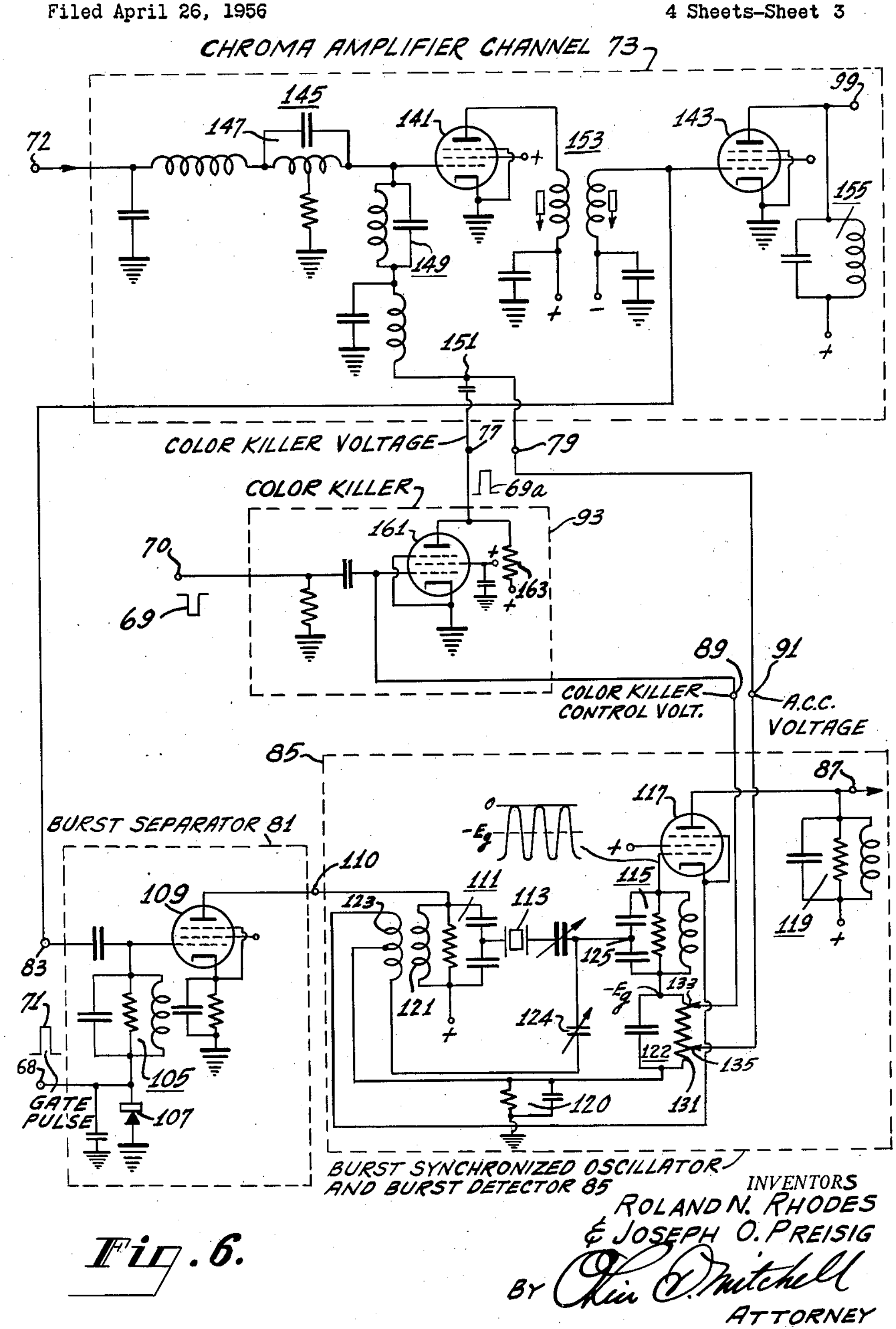
Figures 6, 7 and 8 are schematic diagrams of forms of the present invention.

Figure 6 is a schematic diagram of one form of circuit illustrating the chroma amplifier channel 73, the color killer 93, the burst separator 81 and the burst synchronized oscillator and burst detector 85 of Figure 5.

The chrominance signal is applied to the input terminal 83 and the gate pulse 71 is applied to the input terminal 68 of the burst separator 81. The resonant circuit 105 is resonant at the frequency of the burst. Responsive to the gate pulse 71 developed across the rectifier 107, the control grid of tube 109 is raised to a conduction level only during the duration of the gate pulse 71. The color synchronizing burst which occurs during the time interval of the gate pulse 71, is thereupon amplified to the anode of tube 109 and is developed across the resonant circuit 111 by way of terminal 110.

Consider at this point the detailed operation of the circuit of the present invention in Figure 6, namely, the burst synchronized oscillator and burst detector 85 of Figure 6. The separated color synchronizing burst from the burst separator 81 is developed across the resonant circuit 111 and from there passed through the crystal filter 113 to the resonant circuit 115. One end of the resonant circuit 115 is connected to the control grid of tube 117, and the other end is connected to the grid leak circuit 122. The output of tube 117 is connected to the resonant circuit 119 which is tuned to the frequency of the burst.

The resonant circuit 111 to which the separated burst is applied includes an inductance 121. A second inductance 123 is coupled to the inductance 121; the cathode of tube 117 is coupled by way of inductance 123 to a point 125 of the resonant circuit 115, which is connected to the control grid of tube 117. The circuit from the cathode of tube 117 to the inductance 121 by way of the inductance 123 constitutes a feedback path of energy from the cathode; the feedback energy is translated from inductance 121 through the crystal 113 and the resonant circuit 115 to the control grid of tube 117 so that oscillations will be developed in the electron stream of that tube. A grid leak circuit 122 and the center tap of inductance 123 are coupled to ground by way of the RC circuit 120. The RC circuit 120 is a balancing circuit which balances the residual negative bias voltage of the oscillator with a positive voltage drop produced by current from the cathode of tube 117 so that the voltage developed across resistor 131 of the grid leak 122 relative to ground potential will be zero for the case when no burst is present. The RC circuit 120 is termed the bias balancing RC circuit.

The resonant circuits 111 and 115 and the crystal filter 113 are resonant at the frequency of the separated burst. The oscillations developed by tube 117 are therefore at the frequency of the separated burst. The separated burst is applied to the control grid of tube 117 by way of the crystal filter 113; crystal filter 113, having a very narrow pass band, thereupon filters the separated burst, removing sidebands and many noise components. The filtered burst provided by crystal filter 113 to point 125 will constitute a ringing alternating current wave having the frequency and phase of the burst. This ringing wave will be applied to the control grid of tube 117 and will cause phase-lock of the oscillations developed on tube 117.

According to the form of the present invention shown in Figure 6, both the burst ringing wave and the oscillations developed by the oscillator will be produced simultaneously at the control grid of tube 117. The combination of the ringing wave and the oscillator oscillations will be rectified between the cathode and first control grid of tube 117. This rectification will produce a bias voltage across the grid leak circuit 122. This bias voltage developed across the grid leak 122 is a direct current voltage whose amplitude is proportional to the amplitude of the burst ringing wave, and therefore proportional to the amplitude of the burst and the signal strength of the chrominance signal. The grid leak circuit 122 uses a resitsor 131 which has adjustable taps 133 and 135. Taps 133 and 135 are thereupon coupled to the output terminals 89 and 91. At output terminal 89 a direct current control voltage, which is representative of the presence or absence of the burst, is provided; the control voltage will be at a maximum negative value when the bursts are absent. When the bursts are present, the bias voltage across the grid leak 122 will be negative and proportional to the burst amplitude; for maximum burst during phase synchronism, the bias voltage will be at its most negative value. The control voltage developed at the output terminal 89 may therefore be used as a color killer control voltage.

The tap 135 of the grid leak 122 is coupled to provide a control voltage to the output terminal 91. This control voltage is used as an automatic chroma control voltage or A.C.C. voltage which varies with burst amplitude.

A 3.58 mc. wave which is phase-locked by the burst when present, is developed across the resonant circuit 119 and developed at the output terminal 87 of the burst synchronized oscillator and burst detector 85.

In the form of the burst synchronized oscillator and burst detector 85 shown in Figure 6, the oscillation developing circuits coupled between control grid and cathode perform another useful function in addition to developing oscillations and filtering the bursts. It is noted from the circuit of Figure 6 that the crystal filter 113 also filters the feedback energy from the cathode to the control grid of tube 117. This provides additional stability for the operation of the oscillation developing mechanism of the burst synchronized oscillator and burst detector 85. In addition, the condenser 124 translates 180° out-of-phase separated burst information, relative to the phase of burst information passing through the crystal 113 to terminal 125. The crystal 113 has shunt capacity derived principally from the crystal holder. The 180° out-of-phase separated burst information at terminal 125 will thereupon neutralize burst sidebands passing through the shunt capacity.

The operation of the burst synchronized oscillator and burst detector 85 may also be interpreted in terms of synchronous detecter action. Both the burst-phase locked oscillations by the oscillation developing circuits and the burst ringing wave are developed at the first control grid of tube 117. Synchronous detection of these waves combined at this first control grid, will take place utilizing the rectification between the first control grid and cathode to provide the voltage across the grid leak circuit 122 which is proportional to the results of this synchronous detection and rectification. As has been mentioned previously in connection with other figures of this application, since noise components accompanying even the burst ringing wave include quadrature components, these quadrature components will be eliminated by the synchronous detection action which is only responsive to in-phase signals. This feature causes the circuit of the present invention to be substantially noise immune.

The chroma amplifier channel 73 of Figure 6 uses the tubes 141 and 143 connected in cascade. An applied color television signal is filtered by the input filter circuit 145 which includes the 4.5 mc. sound trap 147 and the resonant circuit 149 which is sufficiently broadband to apply the entire chrominance signal at the control grid of tube 141. A bias voltage point 151 is coupled to the control grid of tube 141. The magnitude of any bias voltage applied at that point will control the gain of tube 141. Tube 141 drives the transformer 153 which in turn drives the control grid of tube 143. The output stage of tube 143 is the circuit 155 across which the amplified chrominance signal is developed. This amplified chrominance signal is thereupon developed at output terminal 99, from which terminal it is applied to the demodulator channel 75. In the form of chroma amplifier channel 73 shown in Figure 6, the chrominance signal and the color synchronizing bursts are coupled from the output of transformer 153 to the input terminal 83 of the burst separator 81. In this way the burst is amplified in tube 141 before the separation of the burst from the chrominance signal by the burst separator 81. It is to be appreciated that the amplified burst can also be derived from the cathode or anode of tube 143. The point of "burst takeoff" from tube 143 will actually depend upon whether or not burst energy is required for the burst separation; in the case of a diode gate circuit, burst energy is used to aid in the gating process.

The automatic chroma control voltage (A.C.C.) delivered to terminal 91 by the burst synchronized oscillator and burst detector 85 is applied to the bias terminal 151 of tube 141 by way of terminal 79. This A.C.C. voltage developed at bias terminal 151 controls the gain of the tube 141 in which both the chrominance signal and burst are amplified. The gain is so controlled by the automatic chroma control voltage that the amplitude level of the burst and chrominance signal produced at the transformer 153 is substantially independent of fluctuations in the signal strength of the chrominance signal region of the color television signal.

The color killer 93, embodying a preferred, but not necessarily definitive color killer circuit, is diagrammed in detail in Figure 6. The color killer control voltage delivered to terminal 89 by the burst synchronized oscillator and burst detector 85 is applied to the control grid of tube 161 of the color killer 93. This color killer control voltage is at its least negative value when the bursts are absent, and at a more negative value when the bursts are present—this more negative value being dependent in actual magnitude upon the amplitude of the burst.

When the bursts are absent the tube 161 of the color killer 93 is biased to be capable of conduction responsive to signals applied to its control grid. Pulses 69 are applied to the control grid of tube 161 by way of terminal 70. These pulses 69, of negative polarity, pulse the conduction of tube 161 so that pulses 69*a* of positive polarity are developed across the output resistor 163. The pulses 69*a* developed across the output resistor 163 are produced at the terminal 77 and therefore at the bias terminal 151 of tube 141; pulses 69*a* will cause the control grid of tube 141 to draw current.

Tube 141 will therefore be caused to conduct during the time intervals normally allotted to the burst in the television signal even though the bursts are not present. In this way the chroma amplifier channel 73 will not be permanently rendered inoperative by monochrome transmission inasmuch as the "takeoff point" for the burst is after the gain control point of that channel. When the pulses 69*a* have caused tube 141 to conduct during burst time and when no bursts have passed through that tube, a combination of bias voltages will be produced at the bias terminal 151; this combination of bias voltages includes the automatic chroma control voltage and a voltage developed across the resistance and condenser parameters in the grid circuit of tube 141 due to the current drawn to the control grid of tube 141 by pulses 69*a*. This combination of bias voltages will cause tube 141 to be biased beyond cutoff until the next pulse 69*a*.

When the bursts are present the color killer control voltage biases the tube 161 of color killer 93 beyond cutoff. No pulses are produced at the bias terminal 151 in response to pulses 69. Tube 141 conducts at all times and its gain is dependent upon the magnitude of the automatic chroma control voltage provided by way of terminal 91 from the burst synchronized oscillator and burst detector 85.

Figure 7:
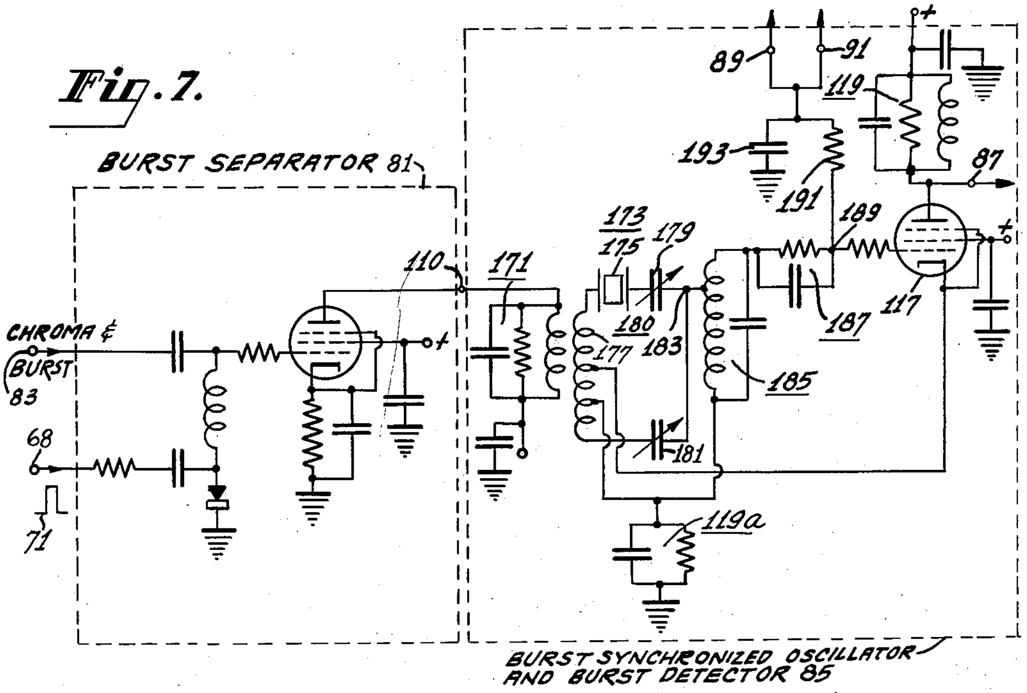

Figure 7 is a schematic diagram of the burst separator 81 of Figure 6 and of a burst synchronized oscillator and burst detector 85 which embodies another form of the present invention. The separated burst from the burst separator 81 is applied by way of the anode terminal 110 to a tuned resonant circuit 171 across which circuit the separated burst is developed. The tank circuit 173 of the burst synchronized oscillator and burst detector 85 includes the tuned resonant circuit 171 and the parallel resonant circuit 185 and involves a coupling circuit 180 having unusual characteristics. This coupling circuit 180 includes the crystal 175 coupled from the inductance 177 of the tuned resonant circuit 171 to the point 183 connected to the resonant circuit 185; the crystal 175 is in series with the condenser 179. The crystal 175 and the condenser 179 are series resonant at the frequency of the burst and have the property of filtering the separated burst as the separated burst is translated to the point 183. The condenser 181 is coupled between point 183 and the end of winding 177 to develop at point 183 separated burst information which is 180° out-of-phase with separated burst information passing through the crystal 175. This out-of-phase separated burst information, translated to point 183, neutralizes any burst sidebands passing through the crystal shunt capacitance. Since the crystal 175 is operated at series resonance, it will exhibit minimum attenuation at the frequency of the burst thereby providing minimum attenuation of the burst as it passes through the crystal.

The resonant circuit 185 is coupled to the control grid of tube 117 by way of the grid leak circuit 187 and to ground by way of the bias-balancing R.C. circuit 119*a*. The cathode of tube 117 is connected to a tap of the inductance 177 with the coupled-to-ground side of the resonant circuit 185 also coupled to a tap of inductance 177. By proper choice of the position of these taps on the inductance 177, oscillations will be developed in the tank circuit 173 and in the electron stream of tube 117. Oscillations developed in the electron stream of tube 117 will thereupon be developed in the output circuit 119 and caused to be presented at the output terminal 87.

The signals developed at the control grid of tube 117 include both the oscillator oscillations presented there by the tank circuit 173 and also a ringing signal due to the filtering of the separated burst by the crystal 175. Rectification of these signals between the cathode and control grid of tube 117 will develop, at the point 189, a control voltage which is proportional to the amplitude of the burst when present and which will also indicate the absence of the burst during monochrome transmission. This control voltage developed is further integrated by an integrating or filter circuit consisting of the resistor 191 and the condenser 193 and is therefrom presented at the terminals 89 and 91 to be used for color killer control and automatic chroma control in a manner described in connection with Figure 6.

Figure 8:
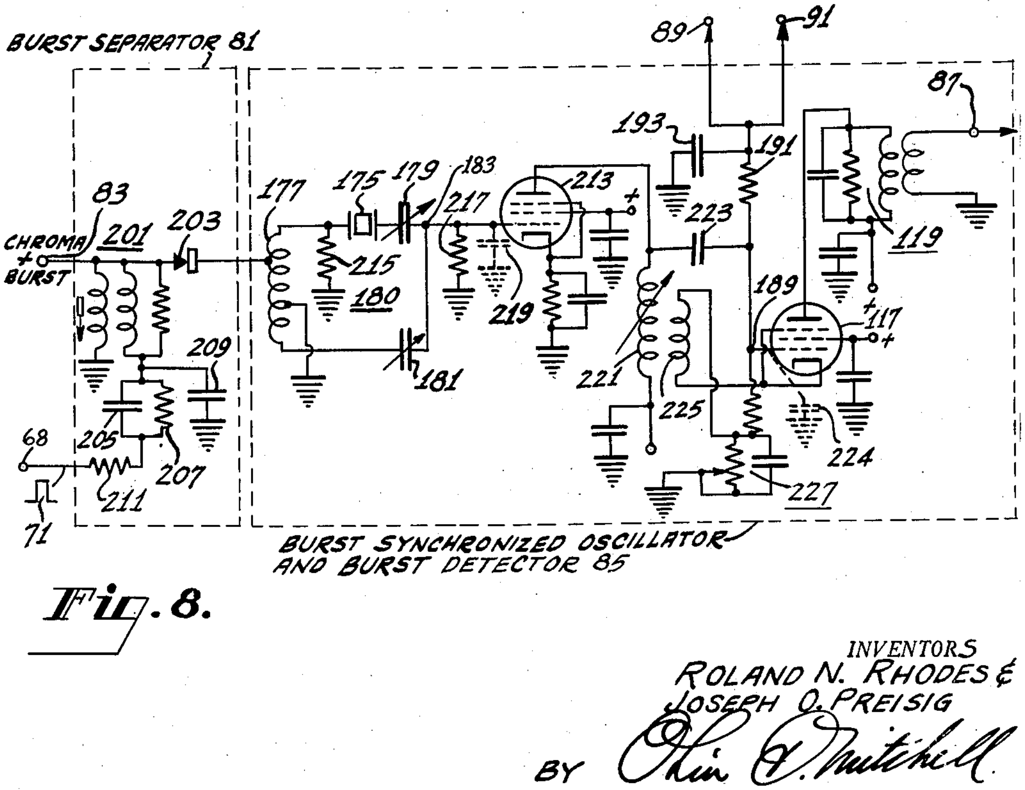

In the burst separator 81 of Figure 8, the chroma and burst are applied by way of terminal 83 to the transformer 201 which is responsive to the frequency band normally occupied by the chrominance signal and the burst. The resonant circuit 201 is connected to the rectifier 203. The gate pulses 71 are coupled from terminal 68 by way of a resistance condenser network, including the condenser 205, the resistance 207, the condenser 209 and the resistance 211, to the terminal of the rectifier 203 to which the output of the transformer 201 is also applied. During the gate pulse 71 the rectifier 203 is caused to conduct thereby passing the burst, which occurs during the interval of the gate pulse 71, to the inductance 177. During intervals between the gate pulses 71 the aforementioned resistance condenser network, responsive to rectification of the gate pulse 71 by the rectifier 203, develops a voltage at the rectifier 203 which prevents conduction through rectifier 203.

The burst synchronized oscillator and burst detector 85 of Figure 8 involves a somewhat different circuit than that used for the corresponding circuits of Figures 6 and 7. The separated burst is, as has been mentioned, applied to the inductance 177. Inductance 177 is the inductance member of the series resonant loop 180 which includes the crystal 175 and the condensers 179 and 181; condenser 181 is a neutralizing condenser. As in the case of the corresponding circuit of Figure 7, the series resonant loop 180 of Figure 8 filters the burst and develops the filtered burst in the form of a continuous ringing signal at the terminal 183. Terminal 183 is coupled to the control grid of tube 213 which functions as an amplifier tube. Resistors 215 and 217 provide proper loading of the crystal 175. The cathode-to-grid capacitance 219 may be considered as a part of the series resonant loop 180.

The filtered burst which is applied to the control grid of tube 213 is thereupon developed across the anode inductance 221 which resonates in combination with the grid-to-cathode capacitance 224. The anode inductance 221 is connected by way of condenser 223 to the control grid of the oscillator tube 117. The cathode of tube 117 is inductively coupled to the anode inductance 221 by way of the coupling loop 225 in a manner whereby oscillations are developed in both the anode inductance 221 and also in the electron stream of tube 117. Both the control grid of tube 117 and the off-cathode terminal of the coupling loop 225 are connected to the bias balancing RC circuit 227. The signals developed at the control grid of tube 117 will thereupon be a combination of both the oscillations developed by oscillator action in the anode inductance 221 and the filtered burst which is developed there by way of amplifier tube 213; the coupling condenser 223 prevents the anode voltage of tube 213 from being applied to the control grid of tube 117. The filtered burst, when present, will also phase-lock the oscillations; rectification between cathode and grid of tube 117 of the filtered burst and of the phase-locked oscillations will develop at the grid terminal 189 a control voltage which is proportional to the amplitude of the filtered burst when present and which is indicative of the absence of any bursts as in the case of monochrome transmission. The control voltage at the grid terminal 189 is thereupon integrated by the filter circuit comprising the resistor 191 and the condenser 193 and developed as a continuous direct current voltage at the output terminals 89 and 91 for use as a color killer control voltage and an automatic chroma control voltage. The phase locked oscillations developed in the electron stream of tube 117 are developed across the output load 119 and therefrom at the output terminal 87.

The circuit of Figure 8 may be alternatively connected whereby a feedback signal may be derived from a tube element of tube 117 and applied to the circuit 180 so that oscillations will be developed through both the crystal 175 and the anode inductance 221; crystal 175 will thereupon also filter the oscillator feedback energy thereby rendering the oscillator action more stable.

Having described the invention, what is claimed is:

1. In a color television receiver adapted to receive a television signal, said television signal including intermittent color synchronizing bursts consisting of oscillatory information during prescribed time intervals and having a prescribed phase and frequency and occurring only during color transmission, the combination of: an oscillator to develop an oscillatory signal which is phase-locked during color transmission to the frequency and phase of said bursts; means to derive from said oscillator a direct current control voltage which varies according to the amplitude of said oscillatory signal and to the amplitude of any oscillatory information occurring in said television signal during said prescribed time intervals normally occupied by said bursts during color transmission; a color information channel coupled to said oscillator for processing signal information in a selected higher frequency range of said television signal; and means for applying said control voltage to said color information channel to control the amplification of said color information channel.

2. In a color television receiver adapted to receive a television signal, said television signal including intermittent color synchronizing bursts having a prescribed phase and frequency only during color transmission, the combination of; an oscillation developing circuit including an electron flow device having an electron flow into which oscillations are introduced to be amplified and therefrom caused to produce sustained oscillations; means to develop during color transmission an oscillatory signal from said bursts; means coupled to said electron flow devices for applying said oscillatory signal to said electron flow; detection means coupled to the output of said oscillatory signal developing circuit for developing a control signal indicative of the presence or absence of said bursts and of the amplitude of said bursts when present; a color information channel for processing signal information in a selected higher frequency portion of the frequency range of said television signal; and means for applying said control signal to said color information channel to render said color information channel inoperative when said bursts are not present and to control the gain of said color information channel according to the amplitude of said bursts during color transmission.

3. In a color television receiver adapted to receive a television signal, said television signal including intermittent color synchronizing bursts having a prescribed phase and frequency only during color transmission, the combination of: an oscillation developing circuit including an electron flow device having an electron flow and including means to introduce oscillations into said electron flow to be amplified and therefrom caused to produce sustained oscillations; means to develop during color transmission an oscillatory signal from said bursts, said oscillatory signal being continuous at least during each scanning line; said oscillation introducing means including means to introduce modulations representative of said oscillatory signal into said electron flow to phase-lock said sustained oscillations; detection means in said oscillatory circuit coupled to said electron flow-device to develop a control signal indicative of the presence or the absence of said bursts and of the amplitude of said bursts when present; a color information channel for processing signal information in a selected higher frequency portion of the frequency range of said television signal; and means for applying said control signal to said color information channel to render said color information channel inoperative when said bursts are not present.

4. In a color television receiver adapted to receive a color television signal, said television signal including a chrominance signal and color synchronizing bursts in a higher frequency range of said television signal only during color transmission, said color synchronizing bursts occupying, when occurring, a prescribed time interval during each retrace interval, the combination of: an oscillator circuit having an electron flow device and a point at which oscillator feedback energy is introduced into the electron flow of said electron flow device to be amplified and cause the development of sustained oscillations; means for developing a continuous oscillatory signal having a frequency and phase and amplitude prescribed by said bursts when said bursts are present; means for impressing said bursts upon said oscillatory signal developing means; means to apply said oscillatory signal at said point of application of feedback energy in said electron flow device to cause said sustained oscillations to be phase-synchronized according to the phase of said oscillatory signal and to develop at that point a reference voltage indicative of the amplitude of said color synchronizing bursts during color transmission and of transmission other than color transmission when said bursts are not present; a chrominance channel for processing and amplifying chrominance signal information in said higher frequency range of said television signal normally occupied by said chrominance signal during color transmission; means for impressing said higher frequency range of said television signal upon said chrominance channel; and means to apply said control voltage to said chrominance channel to render inoperative said chrominance channel when said bursts are absent and to vary the gain of said chrominance channel according to a prescribed relationship with respect to the amplitude of said bursts during said color transmission.

5. In a color television receiver adapted to receive a television signal, said television signal including a chrominance signal and color synchronizing bursts in a higher frequency range of said television signal only during color transmission, said color synchronizing bursts occupying, when occurring, a prescribed time interval during each retrace interval, the combination of: an oscillator circuit having an electron flow device, a resonant circuit tuned to the frequency of said bursts and a point at which oscillator feedback energy is introduced by way of said resonant circuit into the electron flow of said electron flow device to be amplified and cause the development of sustained oscillations; means for developing a continuous oscillatory signal having a frequency and phase and amplitude prescribed by said bursts when said bursts are present; means for impressing said bursts upon said oscillatory signal developing means; means to pass said oscillatory signal through said resonant circuit to said point of application of feedback energy in said electron flow device to cause said sustained oscillations to be phase-synchronized according to the phase of said oscillatory signal; grid-leak means to develop at said point of application of feedback energy a reference voltage indicative of the presence or absence of said bursts and of the amplitude of said bursts when present; a chrominance channel for processing and amplifying chrominance signal information in said higher frequency range of said television signal normally occupied by said chrominance signal during color transmission; means for impressing said higher frequency range of said television signal upon said chrominance channel; and means to apply said reference voltage to said chrominance channel to render inoperative said chrominance channel when said bursts are absent and to vary the gain of said chrominance channel according to a prescribed relationship with respect to the amplitude of said bursts during said color transmission.

6. In a color television receiver adapted to receive a color television signal, said television signal including a chrominance signal and color synchronizing bursts in a higher frequency range of said television signal only during color transmission, said color synchronizing bursts occupying, when occurring, a prescribed time interval during each retrace interval, the combination of: an electron tube having an anode, control grid and a cathode; an oscillation output circuit coupled between said anode and cathode; a tank circuit resonant at the frequency of said bursts and coupled to at least said control grid and cathode to develop oscillations and to present feedback oscillations at said control grid from said oscillation output circuit; means including said tank circuit to filter said bursts during color transmission to develop a ringing signal having a frequency and phase prescribed by said bursts and to apply said ringing signal to said control grid to both phase-synchronize said oscillations and to cause the rectification of both said ringing signal and said feedback oscillations to develop a control voltage indicative of the presence or absence of said bursts and of the amplitude of said bursts during color transmission; a chrominance channel for processing and amplifying signal information in said higher frequency range of said television signal normally occupied by said chrominance signal during color transmission; means for impressing said higher frequency range of said television signal upon said chrominance channel; and means to apply said control voltage to said chrominance channel to render said chrominance amplifier inoperative when said bursts are absent and to vary the gain of said chrominance amplifier in prescribed relationship to the amplitude of said bursts during color transmission.

7. In a color television receiver adapted to receive a color television signal, said television signal including a chrominance signal and color synchronizing bursts in a higher frequency range of said television signal only during color transmission, said color synchronizing bursts occupying, when occurring, a prescribed time interval during each retrace interval, the combination of: an electron tube having an anode, control grid and a cathode; an oscillation output circuit coupled between said anode and cathode; a tank circuit resonant at the frequency of said bursts and coupled to at least said control grid and cathode to develop oscillations and to present feedback oscillations at said control grid from said oscillation output circuit; means including said tank circuit to filter said bursts during color transmission to develop a ringing signal having a frequency and phase prescribed by said bursts and to apply said ringing signal to said control grid to both phase-synchronize said oscillations and to cause the rectification of both said ringing signal and said feedback oscillations to develop a control voltage indicative of both the amplitude of said bursts during color transmission and also of transmission other than color transmission as indicated by the absence of said bursts; a chrominance channel for processing and amplifying signal information in said higher frequency range of said television signal normally occupied by said chrominance signal during color transmission; means for impressing said higher frequency range of said television signal upon said chrominance channel; means to apply said control voltage to said chrominance channel to vary the gain of said chrominance channel according to a prescribed relationship to the amplitude of said bursts during color transmission; an electron discharge device operable for providing an electron discharge during each retrace interval; means for pulsing said electron discharge device to render it operative; means to apply said control voltage to said electron discharge device to render said device inoperative during color transmission when said bursts are present and to render said device operative when said bursts are absent; and means coupled to said electron discharge device to render said chrominance signal channel inoperative during the scanning line interval following each retrace interval when said bursts are absent.

8. In a color television receiver adapted to receive a color television signal, said television signal including a chrominance signal and color synchronizing bursts in a higher frequency range of said television signal only during color transmission, said color synchronizing bursts occupying, when occurring, a prescribed time interval during each retrace interval, the combination of: an electron tube having an anode, control grid and a cathode; an oscillation output circuit coupled between said anode and cathode; a tank circuit resonant at the frequency of said bursts and coupled to at least said control grid and cathode to develop oscillations and to present feedback oscillations at said control grid from said oscillation output circuit; means including said tank circuit to filter said bursts during color transmission to develop a ringing signal having a frequency and phase prescribed by said bursts and to apply said ringing signal to said control grid to both phase-synchronize said oscillations and to cause the rectification of both said ringing signal and said feedback oscillations to develop a control voltage indicative of both the amplitude of said bursts during color transmission and also of transmission other than color transmission as indicated by the absence of said bursts; a chrominance channel for processing and amplifying signal information in said higher frequency range of said television signal normally occupied by said chrominance signal during color transmission; means for impressing said high frequency range of said television signal upon said chrominance channel; means to apply said control voltage to said chrominance channel to vary the gain of said chrominance channel according to a prescribed relationship to the amplitude of said bursts during color transmission; an electron discharge device operable for providing an electron discharge during each retrace interval; means for pulsing said electron discharge device to render it operative; means to apply said control voltage to said electron discharge device to render said device inoperative during color transmission when said bursts are present and to render said device operative when said bursts are absent; and means responsive to the pulsing of said electron discharge device to render said chrominance signal channel inoperative and to render said channel inoperative between said time intervals normally occupied by said bursts and to render said chrominance signal channel operative during said time intervals normally occupied by said bursts when said bursts are absent.

9. In a color television receiver adapted to receive a color television signal, said television signal including a chrominance signal and color synchronizing bursts in a higher frequency range of said television signal only during color transmission, said color synchronizing bursts occupying, when occurring, a prescribed time interval during each retrace interval, the combination of: an electron tube having an anode, control grid and a cathode; an oscillation output circuit coupled between said anode and cathode; a tank circuit including both a piezoelectric crystal and a resonant circuit including an inductance and a capacitive circuit, both said crystal and said resonant circuit resonant at the frequency of said bursts; means including a grid leak circuit to couple said tank circuit to said control grid and cathode to develop oscillations and to present feedback oscillations at said control grid from said oscillation output circuit; means to filter said bursts during color transmission using said tank circuit to develop a ringing signal having a frequency and phase prescribed by said bursts and to apply said ringing signal to said control grid to both phase-synchronize said oscillations and to cause the rectification of both said ringing signal and said feedback oscillations to develop a control voltage indicative of both the amplitude of said bursts during color transmission and also of transmission other than color transmission as indicated by the absence of said bursts across said grid leak circuit; a chrominance signal channel for processing and amplifying signal information in said higher frequency range of said television signal normally occupied by said chrominance signal during color transmission; means for impressing said high frequency range of said television signal upon said chrominance channel; and means to apply said control voltage to said chrominance signal channel to render said chrominance signal channel inoperative when said bursts are absent and to vary the gain of said chrominance signal channel in prescribed relationship to the amplitude of said bursts during color transmission.

10. In a color television receiver adapted to receive a television signal, said television signal including intermittent color synchronizing bursts having a prescribed phase and frequency only during color transmission, the combination of: an oscillation developing circuit including an electron flow device having an electron flow and a grid leak circuit coupled to a point of said electron flow into which oscillations are introduced to be amplified by said electron flow and therefrom caused to produce sustained oscillations; means to develop during color transmission an oscillatory signal from said bursts, said oscillatory signal continuous at least during each scanning line; means to apply modulations representative of said oscillatory signal into said grid leak circuit to phase-lock said sustained oscillations and to develop a control signal indicative of the presence or absence of said bursts and also of the amplitude of said bursts when present; a color information channel for processing and amplifying signal information in a selected higher frequency portion of the frequency range of said television signal; means for impressing said higher frequency range of said television signals upon said color information channel; and means for applying said control signal to said color information channel to render said color information channel inoperative when said bursts are not present and to control the gain of said color information channel according to the amplitude of said bursts during color transmission.

11. In a color television receiver adapted to receive a television signal, said television signal including intermittent color synchronizing bursts having a prescribed phase and frequency only during color transmission, the combination of: an oscillation developing circuit including an electron flow device having an electron flow into which oscillations are introduced to be amplified and therefrom caused to produce sustained oscillations; means to develop during color transmission an oscillatory signal from said bursts; means to introduce said oscillatory signal into said electron flow; detection means traversed by at least a portion of the electron flow in said electron flow device to develop a control signal indicative of the presence or absence of said bursts; a color information channel for processing and amplifying signal information in a selected higher frequency portion of the frequency range of said television signal; means for impressing said higher frequency range of said television signal upon said color information channel; and means for applying said control signal to said color information channel to control the gain of said color information channel according to the amplitude of said bursts during color transmission.

12. In a color television receiver adapted to receive a television signal, said television signal including intermittent color synchronizing bursts having a prescribed phase and frequency only during color transmission, the combination of: an oscillation developing circuit including an electron flow device having an electron flow and including means to introduce oscillations into said electron flow to be amplified and therefrom caused to produce sustained oscillations; means to develop during color transmission an oscillatory signal from said bursts, said oscillatory signal continuous at least during each scanning line; said oscillation introducing means including means to introduce modulations representative of said oscillatory signal into said electron flow to phase-lock said sustained oscillations and also detection means traversed by at least a portion of the electron flow in said electron flow device to develop a control signal indicative of the presence or the absence of said bursts and of the amplitude of said bursts when present; a color information channel for processing and amplifying signal information in a selected higher frequency portion of the frequency range of said television signal; means for impressing said higher frequency range of said television signal upon said color information channel; and means for applying said control signal to said color information channel to render said color information channel inoperative when said bursts are not present and to control the gain of said color information channel according to the amplitude of said bursts during color transmission.

13. In a color television receiver adapted to receive a color television signal including a burst signal of predetermined frequency and including a chrominance amplifier, an injection locked oscillator circuit connected to provide continuous oscillations at said predetermined frequency, means for applying said burst signal to said injection locked oscillator circuit to provide an oscillator output signal having a predetermined phase relationship to said burst signal, synchronous detector means in said oscillator circuit to develop a direct current control voltage of an amplitude related to the amplitude of said burst signal, and means for applying said control voltage to said chrominance amplifier to control the gain thereof in accordance with the amplitude of said burst signal.

References Cited in the file of this patent

UNITED STATES PATENTS

| | | |
|---|---|---|
| 2,681,379 | Schroeder | June 15, 1954 |
| 2,740,046 | Tellier | Mar. 27, 1956 |
| 2,757,229 | Larky | July 31, 1956 |
| 2,776,334 | Goldberg | Jan. 1, 1957 |
| 2,835,728 | Flood et al. | May 20, 1958 |

OTHER REFERENCES

RCA LB-811, Fig. 5, page 5, Dec. 5, 1950.

Introduction to Color TV, Kaufman and Thomas, J. F. Rider Publisher, Inc.; copyright 1954; G. E. circuit facing inside back cover.

Circuit Diagram RCA Model 21-CT-7835, Service Data, 1956, T5.